Dec. 16, 1969 W. R. BAYNES ET AL 3,484,828

TONE ARM RESETTING MEANS FOR A PHONOGRAPH TOY

Filed Feb. 28, 1968

INVENTORS
WILLIAM R. BAYNES
GABRIEL MARASON, JR.
JACK L. BARCUS

BY Herzig, Walsh & Blackham
ATTORNEYS

United States Patent Office 3,484,828

Patented Dec. 16, 1969

3,484,828

TONE ARM RESETTING MEANS FOR A PHONOGRAPH TOY

William R. Baynes, Palos Verdes Peninsula, Gabriel Marason, Jr., Los Angeles, and Jack L. Barcus, Palos Verdes Peninsula, Calif., assignors to Mattel, Inc., Hawthorne, Calif., a corporation of California Filed Feb. 28, 1968, Ser. No. 708,958
Int. Cl. G11b *17/06*
U.S. Cl. 274—15 5 Claims

ABSTRACT OF THE DISCLOSURE

A tone arm resetting means including a needle-engaging portion and is pivotally connected to a recorded-message carrier means by pivot means permitting 360° rotation in the plane of the top face of a phonograph record disc. The resetting means rides around on the record without swinging about its own pivot until the resetting means engages the groove-tracking phonograph needle once during each revolution of the disc for progressively moving the needle-engaging portion from the outer periphery of the record to the inner periphery thereof where the next revolution of the disc causes the needle-engaging portion to engage the needle at the end of the play area and carry it back to the beginning of the play area at the outer periphery of the record.

BACKGROUND OF THE INVENTION

The background of the invention will be set forth in two parts:

Field of the invention

The present invention pertains generally to the field of resetting means for the tone arm in toy phonographs and more particularly to an inexpensive resetting means which is given 360° of rotation by having the top face of the turntable spindle terminated in approximately the same plane as the top face of the phonograph record disc.

Description of the prior art

United States Patents Nos. 1,318,104; 1,407,090; 1,631,797; 2,369,938 and 2,886,328 disclose tone arm resetting devices which are spring biased against a suitable stop member, such as the turntable spindle. These devices include a needle-engaging portion which is normally positioned adjacent the end of a recording and which is swung approximately 180° to carry the needle to the outer periphery of the record. The needle is then released and a spring returns the device to its normal position.

One disadvantage with this type of resetting device resides in the fact that the spring adds to the first-cost of the device.

Another disadvantage resides in the fact that mechanical failure may occur due to the impacting of the device against the stop under the influence of the spring.

SUMMARY OF THE INVENTION

In view of the foregoing factors and conditions characteristic of tone arm resetting devices, it is a primary object of the present invention to provide a new and useful tone arm resetting means not subject to the disadvantages enumerated above and having pivot means connecting it to a recorded-message carrier for 360° rotation in the plane of the top face of the recorded-message carrier means.

Another object of the present invention is to provide a device of the type described which is economical to manufacture, simple to use and substantially maintenance free.

According to the present invention, a phonograph toy comprises a recorded-message carrier means, tone arm means and tone arm resetting means. The recorded-message carrier means includes a sound record disc having a top face provided with a grooved recording defining a play area thereon, turntable means having a first portion underlying the disc and a second portion encompassed by the disc and spindle means rotatably mounting the turntable means. The tone arm means has needle means for tracking the grooved recording and the second portion of the turntable means has a top face lying in approximately the same plane as the top face of the disc.

Additionally, the spindle means has a top face lying in approximately the same plane as the top faces of the disc and the second portion of the turntable means and the resetting means is pivotally connected to the recorded-message carrier means by pivot means permitting free, 360° rotation of the resetting means in the plane of the top faces of the disc, the second portion of the turntable means and the spindle means. With this arrangement, the stop member and the spring biasing the resetting device into engagement therewith of the types employed in the prior art are eliminated. The tone arm resetting means resets the needle means from the end of the play area to the beginning thereof automatically and includes means engageable by the tone arm means and the needle means for lifting the needle means from the disc and carrying it to the beginning of the play area during continued rotation of the recorded-message carrier means while the needle holdes the resetting means from revolving with the carrier means.

The needle-engaging means is returned to a position adjacent the end of the play area by engagement of the needle means with the resetting means during the tracking of a sound record groove in the play area.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF THE PREFERRED EMBODIMENTS

Figures 1, 2, 6:
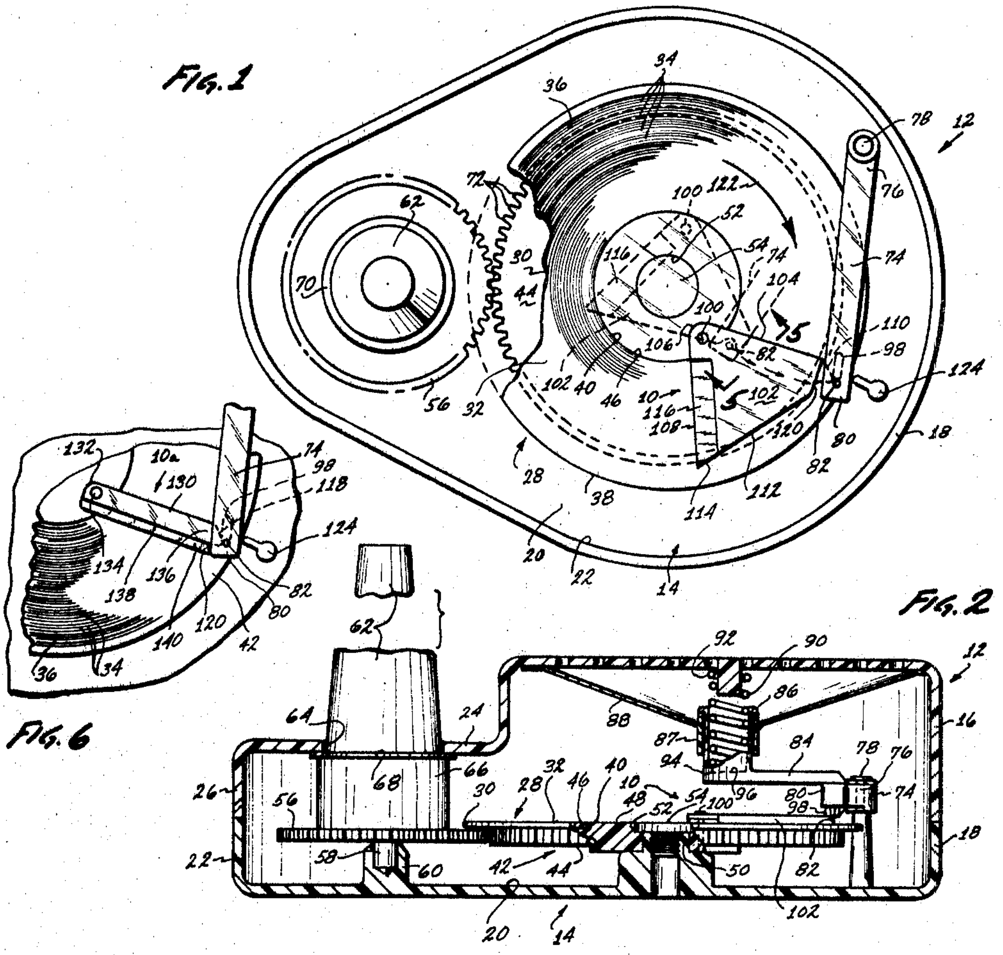
FIGURE 1 is a top plan view, with parts removed to show internal construction, of a tone arm resetting means of the present invention in combination with a phonograph toy.
FIGURE 2 is a cross-sectional view of the device of FIGURE 1.
FIGURE 6 is a view similar to FIGURE 3 showing a modified tone arm resetting means of the present invention.
Figure 3:
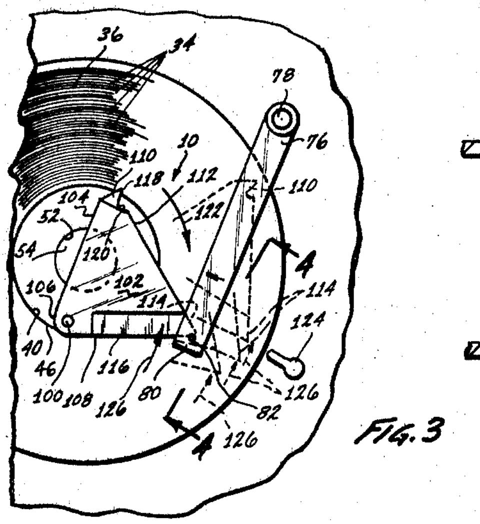
FIGURE 3 is a partial plan view similar to FIGURE 1 showing the relative location of certain parts thereof during a different period of operation than that shown in FIGURE 1.
Figures 4, 5:
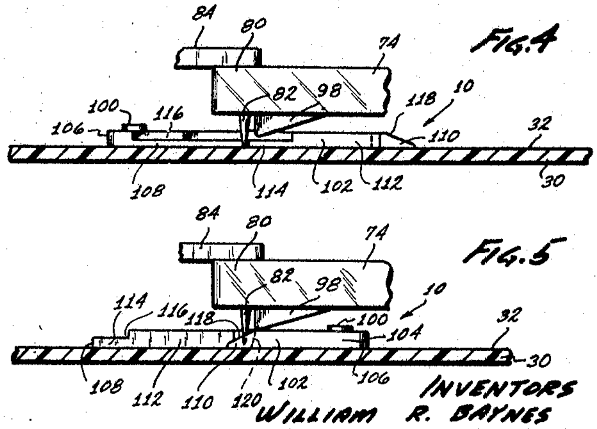
FIGURE 4 is an enlarged, partial cross-sectional view taken along line 4—4 of FIGURE 3.
FIGURE 5 is an enlarged, partial cross-sectional view taken along line 5—5 of FIGURE 1.

Referring again to the drawings and more particularly to FIGURES 1–5, a tone arm resetting means constituting a first embodiment of the present invention, generally designated 10, is shown in combination with a phonograph toy 12 including a housing 14 having an upper housing half 16 and a lower housing half 18.

The housing half 18 includes a bottom wall 20 and an encompassing side wall 22 and the upper housing half 16 includes a top wall 24 and an encompassing side wall 26. A recorded-message carrier means 28 is provided in housing 14 and includes a sound record disc 30 having a top face 32 provided with a plurality of sound record grooves 34 defining a play area 36 extending from an outer periphery 38 to an inner periphery 40 of record disc 30. Recorded-message carrier means 28 also includes a turntable means 42 having a first portion 44 underlying disc 30 and a second portion 46 encompassed by disc 30. The second portion 46 includes a top face 48 lying in substantially the same plane as the top face 32 of disc 30. Turntable means 42 is rotatably mounted in housing 14 on a fixed spindle 50 upstanding from bottom wall 20. Turntable means 42 may be retained in position on spindle 50 by a suitable cap screw 52 having an upper face 54 lying approximately in the same plane as the upper faces 32 and 48 of disc 30 and turntable means 42, respectively.

Turntable means 42 may be rotated by a suitable gear 56 having a spindle 58 journaled in a hollow boss 60 upstanding from bottom wall 20 and a handle member 62 extending upwardly through an aperture 64 provided in top wall 24. Handle 62 includes a large-diameter portion 66 forming an annular shoulder 68 which carries a washer 70 bearing against top wall 24 to prevent dislodgment of gear 56 from driving engagement with a plurality of teeth 72 formed on the periphery of turntable means 42.

Phonograph toy 12 also includes a tone arm means 74 having a first end 76 pivotally connected to a post 78 extending upwardly from bottom wall 20 and a second end 80 extending over disc 30. A phonograph needle means 82 is affixed to free end 80 and is biased into engagement with grooves 34 by an arm 84 extending from a piston 86 reciprocably mounted in a cylinder 87 forming part of a speaker cone 88. A spring 90 has a first end 92 bearing against top wall 24 and a second end 94 bearing against the bottom wall 96 of piston 86 for maintaining arm 84 in engagement with tone arm means 74. Free end 80 of tone arm means 74 also carries a wedge-shaped cam 98 adapted to engage tone arm resetting means 10, in a manner to be hereinafter described, and lift needle means 82 out of grooves 34 against the force exerted by spring 90.

Tone arm resetting means 10 is pivotally connected to the upper face 48 of turntable means 42 by a pivot means 100 which permits resetting means 10 to rotate 360° in substantially the same plane as upper faces 32, 48 and 54 of record 30, turntable means 42 and cap screw 54, respectively. It will be apparent to those skilled in the art that resetting means 10 will be carried around by upper face 48 during rotation of turntable means 42 without rotating about pivot means 100 unless resetting means 10 is held stationary while turntable 42 continues to rotate. This will then cause resetting means 10 to swing about pivot means 100. Resetting means 10 is shown for purposes of illustration, but not of limitation, as comprising a substantially triangularly-shaped member 102 having a first side 104 forming a corner 106 with a second side 108 and a corner 110 with a third side 112. A third corner 114 is formed by the junction of sides 108 and 112. Side 108 includes an undercut portion 116 extending from corner 114 to a point adjacent corner 106 to compensate for cam 98 while needle means 82 is engaged in record grooves 34 in contact with side 108. That is to say, as clearly shown in FIGURE 4, cam 98 relieves into undercut portion 116 when side 108 is presented to needle means 82 while it is engaged in record grooves 34. Otherwise, cam 98 would engage the upper surface of member 102 and elevate needle means 82 to the position shown in FIGURE 5, as will be more fully explained hereinafter. Side 108 engages needle means 82 once during each revolution of disc 30 for moving member 102 progressively from the position shown in solid lines in FIGURE 1 to the position shown in solid lines in FIGURE 3. This is accomplished by rotating disc 30 in the direction of arrow 122 causing member 102 to pivot on pivot means 100 bringing corner 110 out from under free end 80 of tone arm means 74. Needle means 82 will then engage grooves 34 while member 102 overlies play area 36 with side 108 lying in the path of travel of needle means 82 as it moves inwardly toward inner periphery 40. Each time disc 30 completes a revolution, needle means 82 will engage side 108. Thus, member 102 rides around with disc 30 without rotating about its pivot means 100 until side 108 engages needle means 82 for progressively moving member 102 about pivot means 100 in a counter-clockwise direction, as indicated by arrow 125 in FIGURE 3, moving member 102 in steps or progressively from the solid line position to the broken line position shown in FIGURE 1 (also exemplified by the solid line position shown in FIGURE 3). During this movement, member 102 follows the path indicated schematically in FIGURE 3 by the broken line positions of corner 114 until corner 110 reaches the solid line position shown in FIGURE 3. Corner 110 is provided with a cam surface 118 engageable by cam 98 for elevating tone arm means 74 when needle means 82 reaches the inner periphery 40 of play area 36. At this time, needle means 82 will engage a recess 120 provided in side 112 adjacent corner 110. Continued rotation of disc 30 clockwise in the direction of arrow 122 will cause corner 110 to move from the position shown in solid lines in FIGURE 3 to the position shown in solid lines in FIGURE 1 returning needle means 82 from inner periphery 40 to the outer periphery 38 where free end 80 of tone arm means 74 engages a fixed stop 124 extending upwardly from bottom wall 20.

Continued rotation of disc 30 in the direction of arrow 122 again causes member 102 to pivot on pivot means 100 bringing corner 110 out from under free end 80 of tone arm means 74 so that needle means 82 will again engage grooves 34 starting another playing cycle.

A modified tone arm resetting means 10*a* is shown in FIGURE 6 and may be connected to the upper face 48 of turntable means 42 in operative association with the tone arm means 74 and needle means 82. Resetting means 10*a* comprises a single arm 130 having a first end 132 affixed to turntable means 42 by a pivot means 134 and a second end 136 provided with the cam surface 118 and the recess 120. Arm 130 also includes a leading edge 138 provided with an undercut portion 140 permitting cam 98 to ride over arm 130 without engaging it while needle means 82 engages edge 138 to return arm 130 to a position where end 138 is adjacent inner periphery 40 of disc 30.

While the particular tone arm resetting means herein shown and described in detail are fully capable of attaining the objects and providing the advantages hereinbefore stated, it is to be understood that they are merely illustrative of the presently preferred embodiments of the invention.

What is claimed is:

1. A phonograph toy comprising a recorded-message carrier means, tone arm means and tone arm resetting means, said recorded-message carrier means including a sound record disc having a top face provided with a sound record groove defining a play area thereon, turntable means having a first portion underlying said disc and a second portion encompassed by said disc and spindle means rotatably mounting said turntable means, said second portion of said turntable means having a top face lying in approximately the same plane as the top face of said disc, said tone arm means having needle means for tracking said groove, said tone arm resetting means resetting said needle means from the end of said play area to the beginning thereof, characterized in that:

said spindle means has a top face lying in approximately the same plane as the top faces of said disc and said second portion of said turntable means; and said resetting means is pivotally connected to said recorded-message carrier means by pivot means permitting 360° rotation in the plane of said top faces.

2. A phonograph toy as stated in claim 1 further characterized in that said tone arm resetting means is connected to said recorder-message carrier means at a point spaced between said play area and said upper face of said spindle means.

3. A phonograph as stated in claim 1 further characterized in that said resetting means includes first means engageable by said needle means to carry said needle means from said end of said play area to said beginning thereof and second means engageable by said needle means once during each revolution of said recorded-message carrier means to progressively swing said resetting means about its pivotal connection for moving said first needle engaging means from said beginning back to said end of said play area during rotation of said record disc with said needle means engaged in said groove.

4. A phonograph toy as stated in claim 3 wherein said resetting means is triangularly shaped with said second needle engaging means being provided on one side of said triangle and said first needle engaging means being provided at the corner formed by the other two sides thereof.

5. A phonograph toy as stated in claim 3 further characterized in that said needle resetting means comprises an arm having one end pivotally connected to said recorded-message carrier means and a free end carrying said first needle-engaging means, said arm having a leading edge comprising said second needle-engaging means.

References Cited

UNITED STATES PATENTS

| | | |
|---|---|---|
| 3,315,966 | 4/1967 | Allen. |
| 3,234,687 | 2/1966 | Elwell. |
| 3,211,460 | 10/1965 | Lea. |
| 2,379,560 | 7/1945 | Barnes. |
| 2,369,938 | 2/1945 | Barnes. |
| 2,177,764 | 10/1939 | Andres. |
| 1,631,797 | 6/1927 | Cooke et al. |

LEONARD FORMAN, Primary Examiner

D. A. DEARING, Assistant Examiner